Patented May 9, 1950

2,507,473

UNITED STATES PATENT OFFICE 2,507,473

COUMARAN DERIVATIVES AND PROCESS FOR PREPARING SAME

Charles Frederick Koelsch, St. Paul, Minn., assignor to Smith, Kline & French Laboratories, Philadelphia, Pa., a corporation of Pennsylvania No Drawing. Application January 3, 1946, Serial No. 638,917

2 Claims. (Cl. 260—346)

This invention relates to a novel series of cyclic compounds and method for their production.

The new compounds according to this invention provide valuable intermediates for use in the synthesis of compounds having therapeutic properties, as, for example, compounds related to morphine.

The novel method according to this invention contemplates subjecting certain known starting compounds to a reaction analogous to the well known Michael reaction, with, however, the essential difference that, as applied heretofore, the Michael reaction has accomplished an intermolecular rearrangement, whereas as applied according to the method of this invention an intramolecular rearrangement is accomplished.

More specifically, the novel compounds comprehended according to this invention will have the structure made apparent by the following formula:

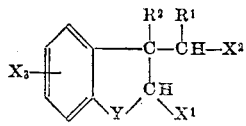

in which $R^1$ and $R^2$ are members of the group consisting of H, an alkyl group, an oxygen-containing alkyl group resulting from the substitution of an oxygen atom between two of the carbon atoms of an alkyl chain, as, for example, $CH_3OCH_2CH_2$—, and a nitrogen-containing alkyl chain, as, for example, $(CH_3)_2 N CH_2CH_2$—; or $R^1$ and $R^2$ together are members of the group consisting of a polymethylene chain, as, for example, —$CH_2CH_2CH_2$—, a polymethylene chain having O between two of the carbon atoms, as, for example, —$CH_2CH_2$—O—$CH_2$—, and a polymethylene chain having an alkyl amine group between two of the carbon atoms, as, for example,

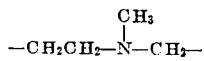

$X^1$ and $X^2$ are members of the group consisting of

R=alkyl less than $C_{10}$, or aryl, and COOR, R= alkyl less than $C_5$; $X^3$ is a member of the group consisting of H, an alkyl group, an alkoxy group and a halogen group and Y is a member of the group consisting of

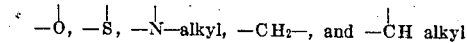

Specific compounds within the purview of this invention from the broad standpoint will be made apparent in connection with the following description of the method according to this invention and specific illustration of its adaption to the production of specific compounds.

As has been indicated, the method according to this invention involves the application of the Michael reaction, i. e., treatment of a particular starting material with basic catalyst, more specifically, an alkali metal or an alkali metal derivative, with or without a solvent or with or without the application of heat with resultant intramolecular rearrangement or, more specifically, rearrangement of the bonds between atoms within in a molecule resulting in the formation of a new ring.

The starting material for carrying out the method according to this invention will be a compound having the following structure:

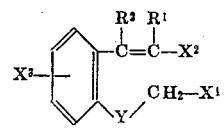

in which $R^1$ and $R^2$ are members of the group consisting of H, an alkyl group, an oxygen-containing alkyl group resulting from the substitution of an oxygen atom between two of the carbon atoms of an alkyl chain, as, for example, $CH_3OCH_2CH_2$— and a nitrogen-containing alkyl chain, as, for example, $(CH_3)_2 N CH_2CH_2$—; or $R^1$ and $R^2$ together are members of the group consisting of a polymethylene chain, as, for example, —$CH_2CH_2CH_2$—, a polymethylene chain having O between two of the carbon atoms, as, for example,

—$CH_2CH_2$—O—$CH_2$— and a polymethylene chain having an alkyl amine group between two of the carbon atoms, as, for example,

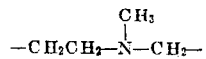

$X^1$ and $X^2$ are members of the group consisting of

R=alkyl less than $C_{10}$, or aryl and COOR, R= alkyl less than $C_5$; $X^3$ is a member of the group consisting of H, an alkyl group, an alkoxy group and a halogen group and Y is a member of the group consisting of

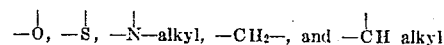

The basic catalyst may be, for example, an alkali metal, as, for example, sodium, potassium, lithium, or an alkali metal derivative, as, for example, of an alcohol, as sodium, potassium, lithium, ethylate, methylate, alkoxylate and the like; an aralkyl or arylorgano alkali metallic compound, as, for example, phenyl lithium, triphenylmethyl lithium, and the like: an alkali metal derivative of ammonia, as, for example, sodamid, potassium amid, and the like, or other equivalent alkali metal compound.

In carrying out the reaction, a solvent for the catalyst and starting material will desirably be used where the starting material and catalyst are solids, and, in general, the use of a solvent will be convenient. As solvents, for example, ethanol, methanol, ether and dioxane may variously be used.

In carrying out the reaction, if desired, heat may be applied to promote the reaction, but the application of heat will not be essential, it being noted that heat will be given off in the reaction.

When the reaction is complete, the product will be recovered, after pouring into water, acidifying to neutralize the alkali metal, if a solid, by filtration, and if a liquid, by extraction, for example, with ether, benzene, chloroform, or other water-immiscible solvent, followed by removal of the solvent.

The product, if liquid, will be purified by distillation and, if solid, by recrystallization from a solvent, as ether, benzene, chloroform, or other suitable solvent.

The procedure according to the method of this invention in detail and specific products within the scope of this invention will be illustrated and made clear by the following examples:

*Example 1*

For the preparation of ethyl 2-carbethoxy-coumaran-3-acetate, a solution of 0.25 g. of sodium in 4 ml. of dry ethanol is added to 14 g. of ethyl coumarate-O-acetate (a known compound) at 25° C. The mixture becomes a deep yellow color and its temperature will rise to about 75° C. After warming the mixture on a water bath for some fifteen minutes, it is neutralized with aqueous acetic acid and the product extracted with ether, neutralized with dilute sodium carbonate and the neutral product purified by distillation. The product was found to boil at 191°–193° C. at 10 mm. mercury and to analyze as follows:

| Calculated for $C_{15}H_{18}O_5$ | Found |
|---|---|
| C, 64.8<br>H, 6.5 | C, 64.6<br>H, 6.8 |

*Example 2*

For the preparation of ethyl 2-carbethoxy-7-methoxycoumaran-3-acetate, 2 g. of ethyl 3-methoxy-coumarate-O-acetate are treated with a few drops of concentrated alcoholic sodium ethoxide. The mixture becomes brown, and the temperature of the mixture rises to about 85° C. The product, ethyl 2-carbethoxy-7-methoxycoumaran-3-acetate, is a colorless oil having a boiling point of 208–211° at 10 mm. mercury which is recovered from the reaction mixture in a manner similar to Example 1 and was found to analyze as follows:

| Calculated for $C_{16}H_{20}O_6$ | Found |
|---|---|
| C, 62.3<br>H, 6.5 | C, 62.0<br>H, 6.5 |

*Example 3*

For the preparation of 2-carbethoxy-3,6-dimethylcoumaran-3-acetate, 2 g. of ethyl 4,β-dimethylcoumarinate-O-acetate at 53° C. are treated with a few drops of alcoholic sodium ethoxide. The mixture becomes dark red and its temperature rises to about 100° C. The product, 2-carbethoxy-3,6-dimethylcoumaran-3-acetate, having a boiling point of 195–196° C. at 9 mm. mercury, is recovered in a manner similar to Example 1 and analyzed as follows:

| Calculated for $C_{17}H_{22}O_5$ | Found |
|---|---|
| C, 66.7<br>H, 7.2 | C, 66.9<br>H, 7.4 |

*Example 4*

For the preparation of ethyl 2-carbethoxy-3,6-dimethylcoumaran-3,α-butyrate, 2 g. of ethyl α-ethyl-4,β-dimethylcoumarinate-O-acetate are warmed to about 45° C. and treated with a few drops of alcoholic sodium ethoxide. The mixture becomes dark and its temperature rises to about 95° C. The product, ethyl 2-carbethoxy-3,6-dimethylcoumaran-3,α-butyrate, having a boiling point of 207–210° C. at 13 mm. mercury, is recovered in a manner similar to Example 1 and analyzes as follows:

| Calculated for $C_{19}H_{26}O_5$ | Found |
|---|---|
| C, 68.3<br>H, 7.8 | C, 68.1<br>H, 7.9 |

*Example 5*

For the preparation of ethyl 6-methylspiro-[coumaran-3,1'-cyclopentane]-2,2'-dicarboxylate, 2 g. of ethyl 4-methyl-α,β-trimethylenecoumarinate-O-acetate are melted, supercooled to 50° C. and treated with 2 drops of alcoholic sodium ethoxide. The mixture becomes dark and its temperature rises to about 80° C. The product, ethyl 6-methylspiro-[coumaran-3,1'-cyclopentane]-2,2'-dicarboxylate, a colorless oil having a boiling point of 219–223° C. at 12 mm. mercury, is recovered in a manner similar to Example 1 and analyzes as follows:

| Calculated for $C_{19}H_{24}O_5$ | Found |
|---|---|
| C, 68.7<br>H, 7.2 | C, 68.9<br>H, 7.4 |

It will now be observed that according to this invention it has been found that by the treatment as described of the compounds defined above as starting material, an intramolecular reaction occurs with the formation of an additional ring, in distinction from an intermolecular reaction, as heretofore occurred in application of the Michael reaction. Further, it has been found that the intramolecular reaction accomplished, unlike the intermolecular reaction, is not inhibited by alkyl constituents on α- and β-carbon atoms of the acceptor group and the reaction apparently goes substantially to completion.

What I claim and desire to protect by Letters Patent is:

1. A compound having the following structure:

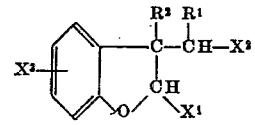

in which $R^1$ and $R^2$ are selected from the group consisting of hydrogen and lower alkyl groups; $X^1$ and $X^2$ are selected from the group consisting of carbalkoxy groups not in excess of five carbon atoms and $X^3$ is a member of the group consisting of hydrogen, lower alkyl groups and lower alkoxy groups.

2. The method of preparing a compound having the following structure:

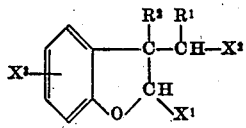

in which $R^1$ and $R^2$ are selected from the group consisting of hydrogen and lower alkyl groups; $X^1$ and $X^2$ are selected from the group consisting of carbalkoxy groups not in excess of five carbon atoms and $X^3$ is a member of the group consisting of hydrogen, lower alkyl groups and lower alkoxy groups, which comprises treating a compound having the structure:

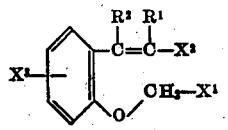

where $R^1$, $R^2$, $X^1$, $X^2$ and $X^3$ are as given above, with a basic catalyst.

CHARLES FREDERICK KOELSCH.

REFERENCES CITED

The following references are of record in the file of this patent:

UNITED STATES PATENTS

| Number | Name | Date |
|---|---|---|
| 714,042 | Seifert et al. | Nov. 18, 1902 |

OTHER REFERENCES

Richter's Organic Chemistry (1923), vol. 3, page 39.

Maurer et al., Zeit. f. physiol. chem., 161: 131–142 (1926).

Meyer, "Lehrbuch der Organisch Chemischen Methodik," Edwards Bros., Inc., Ann Arbor, Mich. (1943), 3rd Band 2nd Teil, 1st Halfte page 497.

Steinkopf, "Die Chemie des Thiophens," Edwards Bros., Inc., Ann Arbor, Mich. (1944), page 163.